United States Patent [19]
Jonsson

[11] 3,930,674
[45] Jan. 6, 1976

[54] COUPLINGS

[76] Inventor: Nils Gunnar Jonsson, 36 Rainbow Ave., Farramere, Benoni, 1500, South Africa

[22] Filed: Mar. 29, 1974

[21] Appl. No.: 456,381

[30] Foreign Application Priority Data
Mar. 30, 1973  South Africa...................... 73/2189
May 9, 1973  South Africa...................... 73/3160
June 21, 1973  South Africa...................... 73/4183
Sept. 21, 1973  South Africa...................... 73/7464

[52] U.S. Cl.................. 285/80; 24/20 S; 24/257 R; 285/137 R; 285/179; 285/272; 285/365; 285/371
[51] Int. Cl.² ........................................ F16L 37/08
[58] Field of Search ........... 285/371, 364, 365, 366, 285/406, 411, 80, 233, 407, 397, 272; 24/20 S, 20 R, 257 R; 339/75 R, 75 M, 75 P; 403/338, 335, 405

[56] References Cited
UNITED STATES PATENTS

| | | | |
|---|---|---|---|
| 740,664 | 10/1903 | Kroll | 285/371 X |
| 1,980,530 | 11/1934 | Hutchison | 285/397 X |
| 2,690,939 | 10/1954 | Whaley | 285/365 X |
| 2,709,094 | 5/1955 | Polanski | 285/407 |
| 2,826,437 | 3/1958 | Detweiler et al. | 285/233 |
| 2,967,723 | 1/1961 | Willis | 285/233 |
| 3,124,405 | 3/1964 | Massa | 339/75 M X |
| 3,372,949 | 3/1968 | McLay | 285/364 |
| 3,405,957 | 10/1968 | Chakroff | 285/233 X |
| 3,479,069 | 11/1969 | Sedam | 285/364 |
| 3,669,474 | 6/1972 | Bode | 285/407 X |
| R19,132 | 4/1934 | McGuirk | 285/371 X |

FOREIGN PATENTS OR APPLICATIONS

| | | | |
|---|---|---|---|
| 295,474 | 3/1954 | Switzerland | 285/80 |
| 511,690 | 6/1952 | Belgium | 285/407 |

*Primary Examiner*—Thomas F. Callaghan
*Attorney, Agent, or Firm*—Cushman, Darby & Cushman

[57] ABSTRACT

The invention relates to a pressure fluid coupling and in particular a high pressure hydraulic coupling. The coupling comprises two hollow flanged members, one of which carries a spigot having an O-ring near its end. The spigot is inserted into the bore of the other member and when it homes, the front faces of the flanges will abut. A resilient clip clips over the flanges to hold the coupling members together. Both coupling members may however be female members and a coupling device having "O"-rings near its ends may be inserted into the bores of coupling members.

9 Claims, 15 Drawing Figures

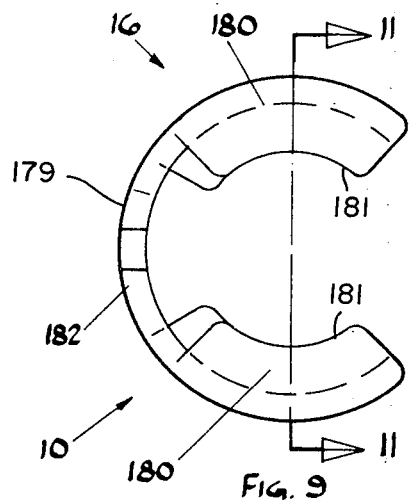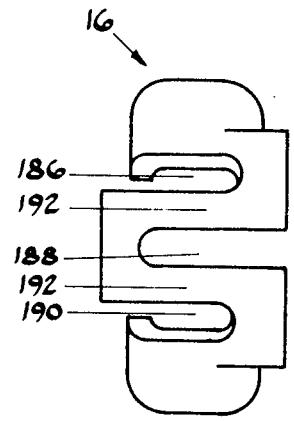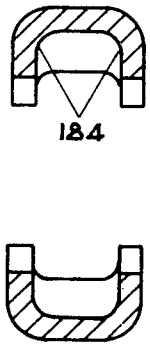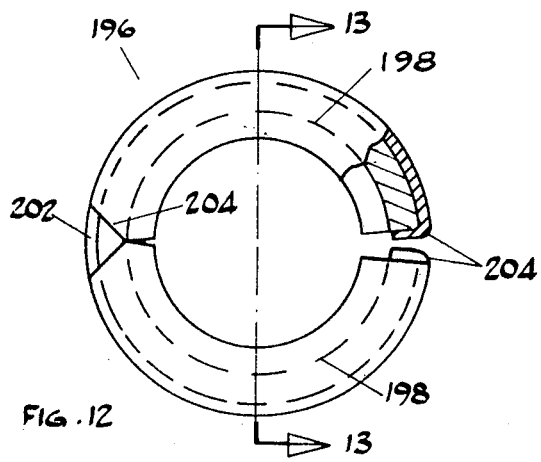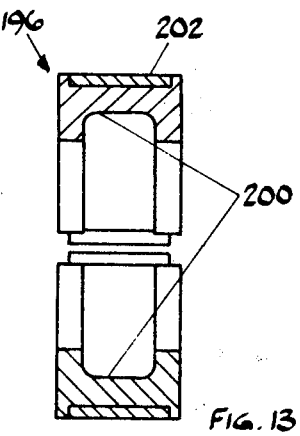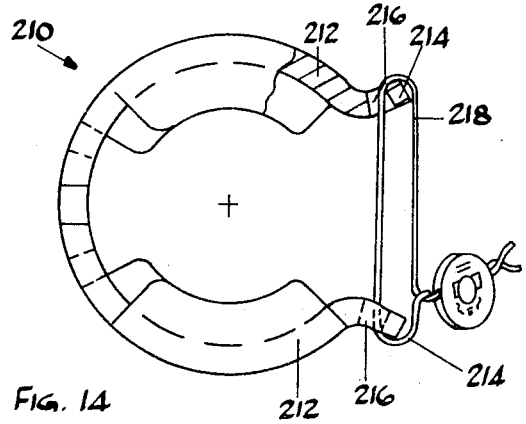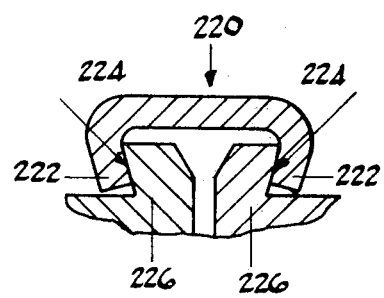

COUPLINGS

This invention relates to couplings.

This invention is concerned with couplings for hoses and and pipes through which passes high pressure fluid and in particular high pressure hydraulic fluid.

BACKGROUND TO THE INVENTION

The most commonly used high pressure hydraulic coupling comprises a swivelling nut on one of the coupling parts and a threaded boss on the other. This type of coupling has a number of disadvantages. A main disadvantage is that space is required for turning the nut with a spanner. Another major disadvantage is that the coupling may be damaged when being used by unskilled labour. Typically the nut may be tightened too much, stripping the thread, may not be tightened enough so that there is not an adequate seal or may be put on skew. A further disadvantage is that the coupling parts cannot turn relative to one another when they are connected. Thus, the hoses must be so arranged that they can accomodate the twist in the hoses when the parts connected by the hose move relative to one another. Finally, considerable time is required for tightening and untightening the coupling parts and this time is increased when there is limited space for moving the spanner or other tightening tool.

Another type of coupling which is commonly known as the "quick coupling" obviates many of these drawbacks. This coupling comprises two parts which are connected together by steel balls which span the space between them. Connecting and disconnecting the two parts can be relatively easily carried out. However, this quick coupling has many serious disadvantages. First the cost of such a coupling is very high due to its complicated design. Second, in practice it has been found to be very sensitive to dirt obstructing the movement of the locking steel balls and sleeves. Third, these couplings malfunction when used in a high pressure hydraulic system and, in particular, such a system where there are high pressure shock loads. The reason for this is that the area of the locking system that has to carry these loads is very small. For these reasons, the quick coupling is less used than the first mentioned coupling.

A third type of coupling is that known as the staple lock coupling. One such coupling is illustrated in Br. Pat. Nos. 1,066,936 and 1,253,981. This type of coupling is fairly new on the market and is gaining popularity. However, this type of coupling also has disadvantages. The unit is usually big and clumsy. The locking staple can only be inserted from a few (usually only four) directions. The cost of manufacture is not insubstantial because internal grooves must be cut on the female member. Most seriously, however, the area on the staple that has to carry the load is rather small, and under high pressure shock conditions deformations occur that result in malfunction.

SHORT DESCRIPTION OF THE INVENTION

According to one aspect of the invention, there is provided a coupling comprising two members having inter-engaging sealing means and flanges, which flanges move into proximity when the sealing means engage, the coupling further comprising resilient clip means to engage the flanges and to hold them together. The preferred position which the flanges take up when being held together as mentioned above, is in abutting relationship.

The coupling preferably includes a hollow connecting device which engages the sealing means on the two members when the flanges move into proximity.

The connecting device may be integral with one of the members which thus becomes a male member.

Alternatively, the two flanged members are both female members and the connecting device is a separate, preferably cylindrical part which fits both female members. It will be seen that the connecting device and one of the female members constitutes in effect the male member described above. One, or preferably both, of the female members may incorporate a stop device to prevent the connecting device being moved along the female member by the pressure on the connecting device. Preferably, however, the connecting device is centrally grooved to receive a circlip or the like which protrudes beyond the surface of the device and, in use, will be positioned between the flanges to locate the device in position in the female members.

According to another aspect of the invention, there is provided a coupling as set out above wherein one of the flanged members has its ends at an angle to one another. This member preferably is provided with sealing means at both ends so that it may be there connected to another flanged member.

The clip means preferably comprises robust parts which prevent the two flanges moving apart and spring means which hold the parts in engagement with the flanges, the arrangement being such that the robust parts counter any major forces caused by pressure fluid passing through the coupling, whereas the spring means does not have to be subject to these forces. The clip means conveniently comprises a resilient arcuate member subtending more than two right angles at the centre of the arc, being provided with two pairs of flanges over the outer portions thereof and being resilient at the central portion between the pairs of flanges so that the ends of the member can be moved apart to allow it to snap over the flanges. The arcuate member may be narrower at the centre portion than at the outer portions. Conveniently there may be cuts extending from opposite sides of the clip in the direction of the axis of the clip at the central portion of the clip so that the resilience of the clip may be provided by the torsional resilience of the parts between the cuts. The outer portions may have elongated arms with openings in the arms whereby a wire seal may pass through the arms to seal the clip means in position.

Alternatively, the clip means may comprise two members which are preferably hemi-cylindrical and formed with recesses to receive the flanges and spring means holding them together. The spring means may be attached to the members or may be separate from them.

Embodiments of the invention will now be described by way of example with reference to the accompanying drawings.

BRIEF DESCRIPTION OF DRAWINGS

FIG. 9 is a side view of a clip, FIGS. 10 and 11 are respectively a view in the direction of arrow 10 and a section on line 11 — 11 of FIG. 9, FIG. 12 is a side view partially in section of a modified clip of the invention, FIG. 13 is a section on line 13 — 13 of FIG. 12, FIG. 14 is a side view of a sealing clip, and FIG. 15 is a transverse section through a further clip.

Figure 1:
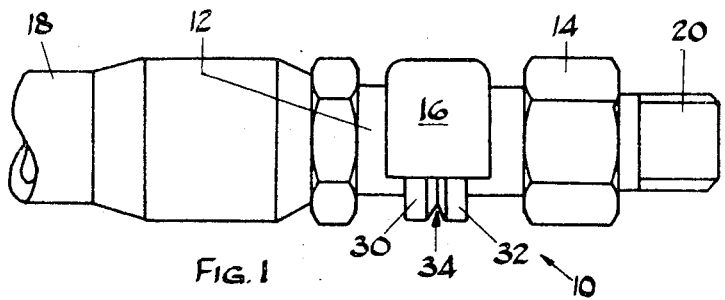
FIG. 1 is a side view of a coupling of the invention in its closed position.
Figure 2:
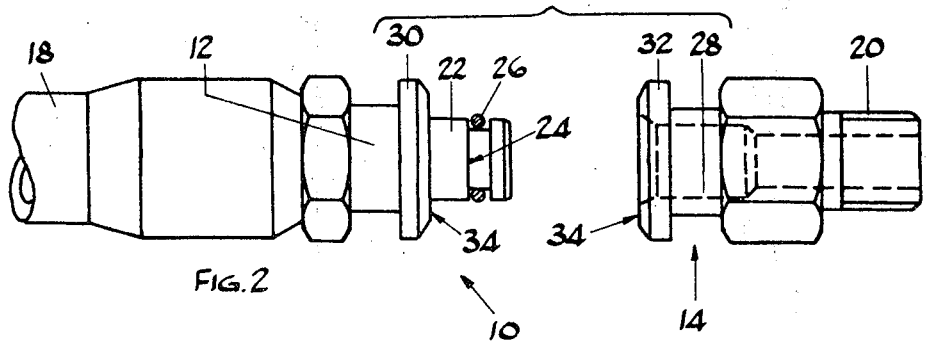
FIG. 2 is a similar view of the coupling of FIG. 1 in its open position.

A coupling incorporating a male part (FIGS. 1 and 2.

Referring now to FIGS. 1 and 2, a coupling 10 of the invention comprises a male part 12, a female part 14 and a clip 16. The spring clip 16 may comprise any one of the clips described below but is preferably the clip illustrated in FIG. 9.

The male part 12 comprises a hose tail (not shown) whereby it may be connected to a reinforced hose 18. The female part 14 has a screw threaded male spud 20 so that this part may be threaded into a threaded aperture in a housing or the like. It will be understood that both or either of the members may have a hose tail or a male or female threaded spud or any other convenient connecting device as desired.

The male part 12 has a spigot 22 which has a groove 24 therein to receive an O-ring 26. The spigot is received within the bore 28 of the female part 14 and when homed therein the O-ring 26 seals against the bore surface.

The parts 12 and 14 have thereon flanges 30 and 32 respectively of the same outside diameter. When the spigot 22 is homed in the bore 28 as mentioned above, the two flanges will be located with their outer faces 34 butting against each other. The spring clip 16 now encompasses the flanges and holds them together.

Figure 3:
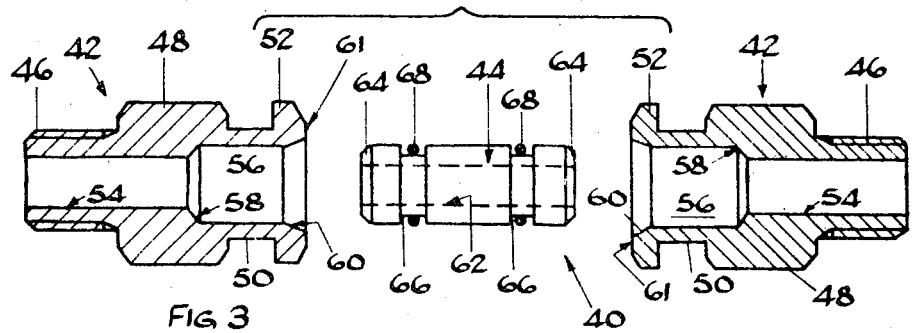
FIG. 3 is an exploded view, partially in section, of a modified coupling of the invention.

A coupling with two female parts (FIG. 3).

Referring now to FIG. 3, there is shewn a coupling 40 of the invention comprising two identical female members 42 and a connecting part 44. Each female member 42 has a screw threaded male spud 46 at one end of a central hexagonal section body part 48. At the other end of the body part 48 there is a cylindrical projection 50 having a flange 52 at its free end. A bore 54 passes through the female member 42. This bore 54 commences within the spud 46 and has an enlarged chamber part 56 to which it leads via a frusto-conical step 58. A short frustoconical lead-in portion 60 is provided under the flange and opening into the chamber part 56.

The edges of the flange 52 are slightly chamfered but for the rest, the front face 61 of the flange 52 is flat.

The connecting part 44 is basically a hollow cylindrical member having a bore 62 therethrough. The ends 64 of the part 44 are slightly chamfered to provide lead-in portions. Slightly behind the ends 64 there are respectively a pair of grooves 66 in which are received O-rings 68.

In use, the coupling 40 is assembled by inserting the connecting part 44 into the chamber part 56 of one of the female members 42 so that its end 64 butts against the step 58. This in effect converts this female member into a member which is substantially identical to the male part 12 described above. The projecting end of the connecting part 44 is now inserted into the chamber part 56 of the other female member 42 and the members 42 are brought together until their front faces 61 butt up aginst one another. A clip as described with reference to and as illustrated in FIGS. 9 or 12 is now applied to the flanges to hold them together.

Figure 4:
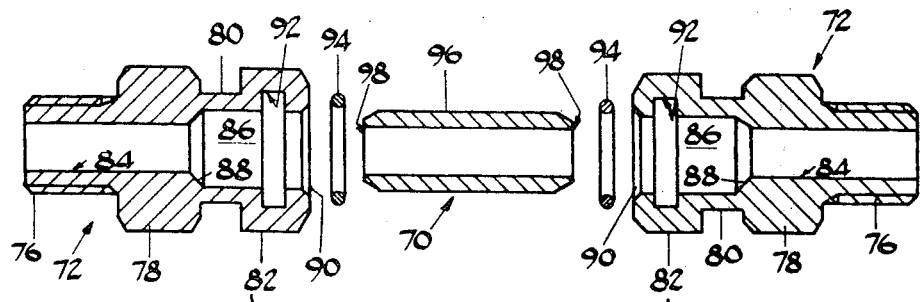
FIG. 4 is an exploded view in section of another coupling of the invention.

A coupling with female parts and a plane connecting part (FIG. 4).

In the modified coupling 70 illustrated in FIG. 4, the female members 72 each one again have a screw threaded male spud 76, a hexagonal body part 78 and a projection 80 having a flange 82 at its end. A bore 84 passes through the member 72 and this leads to a chamber 86 via a frusto-conical step 88. The chamber 86 has a leadin portion 90. The flange 82 is fairly thick (i.e. of substantial axial length) and under the flange 82 there is provided an annular groove 92 in the surface of the chamber part 86.

An O-ring 94 is received in this groove 92. The connecting part 96 is a plain cylinder having chamfered ends 98.

This coupling 70 is assembled in the same way as the coupling 40.

Figure 5:
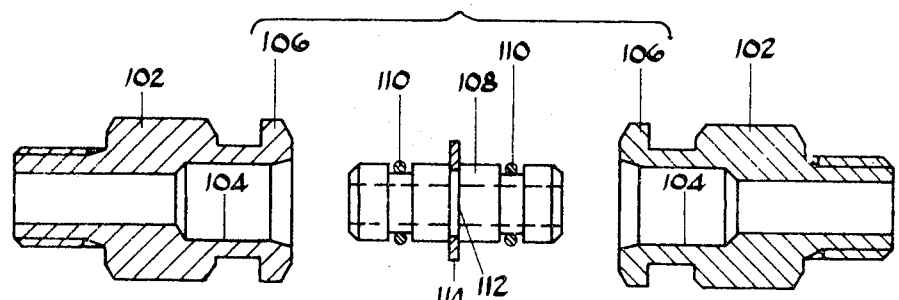
FIG. 5 is a view similar to FIG. 3 of a further coupling of the invention, FIG. 6 shews a valve incorporating yet further couplings of the invention.

Coupling with female parts and a circlip (FIG. 5).

Referring now to FIG. 5, a coupling 100 of the invention comprises two female members 102 which are identical to the members 42, chambers 104 and flanges 106 and a connecting part 108.

This connecting part 108 is substantially identical to the part 44 described above and carries two O-rings 110 near its ends. However, additionally there is a shallow central peripheral groove 112. Received within this groove 112 is a circlip 114 which projects beyond the surface of the part 108 as is usual.

In use, the ends of the connecting part 108 is inserted into the chamber parts 104 of the female members 102. The circlip 114 is larger than the diameter of the chambers and lies in the path of the flanges 106 of the female members 102 and is gripped therebetween when the clip (not shewn) is applied to these flanges.

It will be seen that in this way there is no necessity for accurate location of the internal shoulders in the female members to locate the connecting part accurately.

The connecting part may also be similar to the part 96 of FIG. 4 and the female members similar to members 72. The connecting part would additionally have the groove for the circlip.

Figure 6:
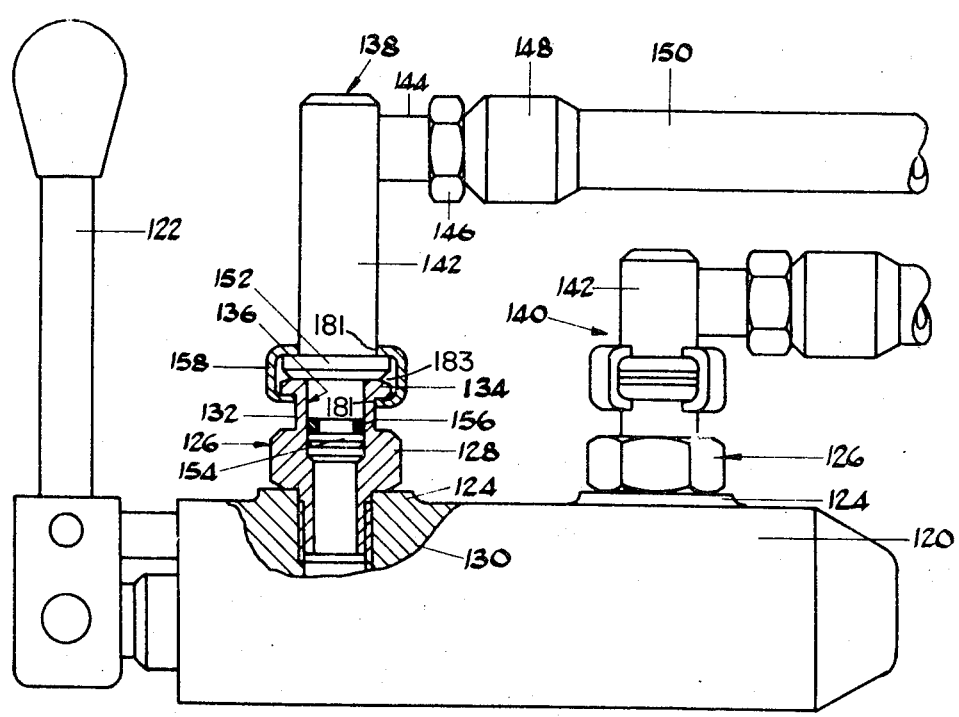

Right Angle Couplings for use with hydraulic valves (FIG. 6).

In FIG. 6 there is shewn an hydraulic valve 120 operated by a lever 122. The valve has at least two ports surrounded by internally threaded bosses 124. A union 126 is received in each boss 124. Each union 126 comprises a body part 128 having an hexagonal outer surface, a spud 130 threaded into the boss 124 and a projection 132 having a flange 134. The union 126 has an internal chamber 136.

A coupling 138 engages one of the unions and a coupling 140 engages the other. The coupling 138 comprises a body part 142 having one end sealed and a shot projection 144 extending at right angles from the body part near the closed end. This projection 144 terminates in a nut part 146 and a hose tail (not shewn) whereby it may be secured through a connector 148 to a high pressure hose 150.

The other end of the body part 142 is provided with a flange 152 and a spigot 154. This spigot has a groove containing an O-ring seal 156. When the spigot 154 homes in the chamber 136, the "O"-ring 156 seals against the chamber and the flanges 152 and 134 abut as described above. A clip 158 which is identical to that illustrated in FIGS. 9 and 10 clips over the flanges to secure them together.

The coupling 140 is substantially identical to coupling 138 save that its body part 142 is somewhat shorter than the corresponding part of coupling 138.

Figure 7:
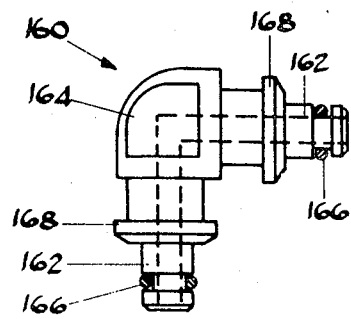
FIG. 7 is a side view of a connecting device of the invention.

Modified Right Angle Connector (FIG. 7)

A right angled connector 160 is shewn in FIG. 7. This connector 160 is adapted to be used with two female members located at right angles to one another. The connector 160 has two spigots 162 joined by a body potion 164. The spigots 162, which carry O-rings 166 in grooves near their ends, may be integral with the body portion 164 or may be connecting parts (similar to part 44 or 108) received in bores in the body portion 164. The body portion 164 has flanges 168 adjacent the spigots 166.

The body portion 164 may be modified to carry the spigots 166 at any convenient angle such as fortyfive degrees.

As the spigots of the connector can swing about their axes, and consequently the body portion can also swing, the use of the coupling can be facilitated.

Female member for attachment to a valve body or the like. (FIG. 8)

Figure 8:
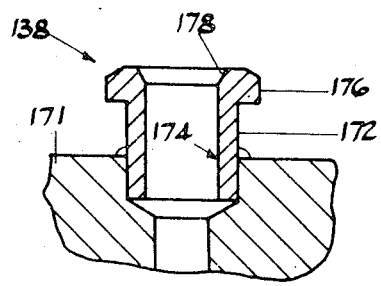
FIG. 8 is a section through a female member forming part of a coupling of the invention.

A female member 138 which is particularly adapted for use with the blocks to which a number of connections are made is in FIG. 8. Here the female member 138 has a cylindrical body 172 with a plain through bore 174 and an external flange 176. There is a short lead-in portion 178 under the flange 176. The body 172 is received in a plain bore in the block 171 and welded, brazed or glued in position. The bore 174 may be plain, as illustrated. However, it may preferably be provided with an internal step such as 58 to provide a stop against which the connecting part may butt. This is particularly desirable where the connecting part is a separate part and the arrangement is such that fluid passing through the coupling tends to urge the connecting part through the bore 174.

The Clip (FIGS. 9, 10 and 11)

The clip 16 comprises a spring steel strip rolled or pressed into shape. The clip 16 includes an arcuate web 179 subtending about 270° at its centre and comprises two end portions 180 and a central or intermediate portion 182. The end portions 180 are folded to form flanges 184 (best shewn in FIG. 11). The inner faces of flanges 184 are spaced apart by about the same distance as are the remote faces of the flanges on the members when they home into one another. The edges 181 of the flanges 180 engage the walls of the conduit members adjacent the conduit walls to space the web 179 outwardly of the peripheries of the conduit flanges so as to form a space 183 (FIG. 6) between the peripheries of the conduit flanges and the web 179.

The intermediate portion 182 is mainly cylindrical with its edges extending beyond the flanges 184. There are three cuts 186, 188 and 190 formed in this portion 182. Cuts 186 and 190 extend from one edge of the portion 182 and the cut 188 extends from the other edge, and between the cuts 186 and 190. Two torsion "bars" 192 are formed between the cuts.

When the clip 16 is applied to the flanges of the members, the end portions will be sprung apart so that they can pass over the flanges. As the clip is placed in position, the outer portions spring back into shape closely encompassing the flanges.

The clip is made of robust material of sufficient thickness to hold the flanges of the coupling members together even when a fluid under very substantial pressure passes through the coupling. However, because the central portion 182 comprises the torsion "bars" 192, the end portions 180 can be relatively easily sprung apart for attachment to or removal from the flanges of the coupling members.

A screw-driver can be used to remove the clip. For this purpose, the projecting area between the cuts 186 and 190, i.e. the space 183, presents a suitable purchase below which the screw-driver can act.

Large Size Clip (FIGS. 12 and 13)

The large size clip 196 shewn in FIGS. 12 and 13 comprises two hemi-cylindrical parts 198 which have inner recesses 200 to receive the flanges 30 and 32. The two parts 198 are held together by a spring 202 surrounding their periphery. The ends 204 of the clip 202 are secured to the parts 198 either by being received in recesses or being welded thereto. The spring 202 enables the parts to pivot over their relieved rear surfaces 204 so that they may pass over the edges of the flanges. It will be seen that the spring 202 takes no forces in the direction axial of the coupling.

The sealed clip (FIG. 14)

A clip 210 which can be sealed is shewn in FIG. 14. It will be seen that this clip is substantially identical with the clip shewn in FIGS. 9 to 11. However, the end portions 212 have extensions or arms 214. There are holes 216 in these arms 214. A sealing wire 218 in use extends between these holes and it is not possible to remove the clip 210 from its position on the flanges of the coupling members without destroying the sealing wire.

The clip 210 can be used with advantage where it is desired that there should be no tampering of the coupling, for example when the coupling is used in a machine which is subject to a guarantee.

A clip with tapering flanges (FIG. 15)

FIG. 15 shews a detail of a clip 220 having flanges 222 which taper inwardly. The remote faces 224 of the flanges 226 of the coupling members also taper inwardly. Thus there is a more positive connection between the clip and the flanges. (The taper is shewn to an exaggerated extent in the drawings).

Observations

The coupling parts can be given more than sufficient area to carry the loads that can be caused by pressures in the hoses to which it is connected. Thus, the coupling can withstand both static and shock loads of very high degree without damage or malfunction. The coupling is easily and quickly operable both for connection and disconnection and can be used by unskilled labour. There is a fixed closed position and there can be no doubt when the coupling is in its sealed condition. The chances of the clip working loose are virtually nil.

With all the embodiments of clips described above, the coupling parts are capable of low speed relative rotation about the axis of the coupling. This means that hoses can be installed without special efforts being made to ensure that they do not twist in service. The coupling can be made very economically because of the simple design.

It will be noted that the parts of the clip joining the flanges are robust and counter any major forces caused by pressure fluid passing through the coupling, whereas the spring means does not have to be subject to these forces.

The clip is normally made of spring steel and is hardened after shaping. However, it may be made of aluminum when the coupling is intended for use in, say, aircraft hydraulic systems. In such cases, the clip will normally be anodised and it would with advantage be anodised in different colours for colour coding. Similarly, any of the clips may be painted with different colours for this purpose.

The connecting member is preferably subjected to a hardening treatment and treatment for making it corrosion resistant.

The coupling of the invention can be used both for hydraulic and pneumatic applications.

MODIFICATIONS.

The invention is not limited to the precise constructional details hereinbefore described and illustrated in the drawings.

For example, the clip 16 may be of plain sheet material rolled into a form generally similar to that illustrated in FIGS. 9 to 11, but without cuts in the central portion. This portion may be ground down slightly to enable this to be more resilient. The clip may also be horse-shoe shape.

The various coupling members may have any convenient shape and may incorporate curved tube parts and the like.

Further, the spigots at the ends of the members 138, 140 and 160 may be replaced by separate connecting devices receivable in female ends of these members.

I claim:

1. A coupling for transmitting high pressure fluid comprising: two conduit members having interengaging sealing means and cylindrical flanges, said conduit flanges being in proximity with each other when the sealing means engage; and snap clip means in the form of a single generally arcuate web member subtending more than two right angles at the center of the arc, said web having two end portions each having a pair of flanges projecting radially inwardly and engaging the side faces of said conduit flanges, said clip flanges extending along a substantial portion of the circumference of said web and being sufficiently robust to prevent the conduit flanges from moving apart under the action of internal fluid pressure, the edges of said clip flanges engaging the walls of said conduit members adjacent said conduit flanges to space said web outwardly of the peripheries of said conduit flanges so as to form a space between said web and the peripheries of said conduit flanges, the central portion of said web being free of flanges and being resilient so that the flanged ends of the clip means can be moved apart to allow the clip means to snap over said cylindrical conduit flanges whereupon the flanges of said clip means resist separation of said conduit flanges and whereby rapid removal of the said clip means may be effected by inserting a tool into said space.

2. A coupling as claimed in claim 1 in which the clip arcuate web and the flanges of the clip means are formed from a single piece of metal.

3. A coupling as claimed in claim 1 in which said space between said web and the peripheries of said conduit flanges is in the form of a part of an annulus.

4. A coupling as claimed in claim 1 in which the clip flanges extend radially inwardly of the web at an angle not greater than approximately right angles.

5. A coupling as in claim 1 wherein the web of said clip means subtends about 270°.

6. A coupling as in claim 1 wherein the web is narrower at its central portion than at its end portions.

7. A coupling as in claim 1 wherein the central portion of the web of said clip is provided with cuts extending from opposite sides in the direction of the axis of said clip so that the resilience of the clip may be provided by the torsional resilience of the portions between the cuts.

8. A coupling as in claim 1 wherein the ends of the clip means have elongated arms with openings in the arms whereby a wire seal may pass through the arms to seal the clip means in position.

9. A coupling as in claim 1 wherein the conduit members are rotatable relative to each other and relative to said clip about the axis of the coupling.

* * * * *